(12) United States Patent
Shibata et al.

(10) Patent No.: US 8,906,506 B2
(45) Date of Patent: Dec. 9, 2014

(54) GLASS ARTICLE

(75) Inventors: Noriaki Shibata, Chiba (JP); Hirokazu Toyoda, Chiba (JP); Keiko Tamamaki, Chiba (JP)

(73) Assignee: Toyo-Sasaki Glass Co., Ltd., Tokyo (JP)

( * ) Notice: Subject to any disclaimer, the term of this patent is extended or adjusted under 35 U.S.C. 154(b) by 518 days.

(21) Appl. No.: 12/990,570

(22) PCT Filed: May 2, 2008

(86) PCT No.: PCT/JP2008/058425
§ 371 (c)(1),
(2), (4) Date: Nov. 1, 2010

(87) PCT Pub. No.: WO2009/133624
PCT Pub. Date: Nov. 5, 2009

(65) Prior Publication Data
US 2011/0052907 A1    Mar. 3, 2011

(51) Int. Cl.
*C03C 3/087* (2006.01)
*C03C 3/095* (2006.01)
*C03C 21/00* (2006.01)
*C03C 4/00* (2006.01)

(52) U.S. Cl.
CPC .............. *C03C 4/0028* (2013.01); *C03C 3/087* (2013.01); *C03C 21/002* (2013.01)
USPC ............................... 428/410; 501/64; 501/70

(58) Field of Classification Search
None
See application file for complete search history.

(56) References Cited

U.S. PATENT DOCUMENTS

| 5,434,111 A | 7/1995 | Clement et al. |
| 5,525,553 A | 6/1996 | Brocheton et al. |
| 5,843,856 A * | 12/1998 | Suha et al. ............... 501/67 |
| 5,925,583 A * | 7/1999 | Yoshii et al. .............. 501/70 |
| 6,391,810 B1 | 5/2002 | Lenhart |
| 2005/0054514 A1 | 3/2005 | Ishioka et al. |
| 2005/0245384 A1 * | 11/2005 | Ito ............................ 501/70 |
| 2009/0088309 A1 | 4/2009 | Niida et al. |
| 2009/0286058 A1 * | 11/2009 | Shibata et al. ............ 428/219 |

FOREIGN PATENT DOCUMENTS

| CN | 1131130 | 9/1996 |
| CN | 1594157 | 3/2005 |
| DE | 4309701 | 6/1994 |
| JP | 6-9241 | 1/1994 |
| JP | 2001-80933 | 3/2001 |
| JP | 3961560 | 5/2007 |
| WO | 2006/043909 | 4/2006 |
| WO | 2007/094373 | 8/2007 |
| WO | 2007/135752 | 11/2007 |

OTHER PUBLICATIONS

Chinese Office Action issued Sep. 3, 2012 in corresponding Chinese Application No. 200880128095.8, with English translation.
International Search Report issued Jul. 22, 2008 in International (PCT) Application No. PCT/JP2008/058425.
English Abstract of WO9513993 (A1), which corresponds to CN 1105343 (Jul. 19, 1995).
Taiwanese Office Action and Search Report.
European Search Report issued Dec. 11, 2013, in corresponding Application No. 08752330.4.

* cited by examiner

*Primary Examiner* — David Sample
(74) *Attorney, Agent, or Firm* — Wenderoth, Lind & Ponack, L.L.P.

(57) ABSTRACT

A noble glass composition which is based on a known potassium-zinc crystal glass composition suitable for chemical strengthening, in which most of contained ZnO component is replaced with a combination of less expensive oxides. The noble glass composition is easily melted in a tank and formed by machine into table wares, and provides a chemical strengthened crystal glass article which has high practical strength as tableware and can be subjected to washing with an alkali.

4 Claims, 5 Drawing Sheets

BENDING STRENGTH TEST

GLASS ARTICLE

TECHNICAL FIELD

The present invention relates to glass articles such as high quality tablewares, vases, ashtrays, decorative illuminations, accessories and other ornaments.

BACKGROUND ART

Crystal glass has been used for high quality tablewares and craftwork because of its characteristic properties, such as high transparence and brightness, weight density, beautiful acoustics, and ease of forming and working.

For labeling an article as crystal glass, it must satisfy the requirements that its oxide composition contains, singly or in combination, 10% by weight of ZnO, BaO, PbO, or $K_2O$, and that it has refractive index $n_d \geq 1.520$ and density $\geq 2.45$ g/cm$^3$ (EC specifications).

Traditional lead (contained as PbO) crystal glass articles and barium (contained as BaO) crystal glass articles have problems in environmental issues and in alkali resistance, because their materials have toxicity or the product glass articles are susceptible to surface erosion upon washing with an alkali.

Common crystal glass articles including known potassium (contained as $K_2O$) crystal glass articles are each not sufficiently suitable for chemical strengthening. Among them, those having small thicknesses are insufficient in strength, because it is difficult to physical strengthen such glass articles having small thicknesses.

To solve these problems, the present inventors have recently developed and prepared for the market a lead-free, barium-free crystal glass having a potassium-zinc (contained as $K_2O$ and ZnO) crystal glass composition, which is superior in chemical strengthening suitability in which sodium ions in a surface layer of the formed article are replaced with potassium ions. The crystal glass composition and the chemical strengthened article are disclosed in Japanese Patent No. 3961560.

However, the disclosed composition becomes difficult to be employed particularly in crystal glass tablewares that are formed by machine and produced in mass production, because the disclosed composition contains 6 percent by weight or more of ZnO, and zinc occupies more than 50% of the material cost of the glass due to the recent price rise of zinc.

In addition, the disclosed crystal glass is designed to have a temperature corresponding to the molten glass viscosity (high-temperature viscosity) Log η=2 of 1430° C. or lower so as to enable hand forming via melting in a crucible, whereas it is designed to have a cooling time of 110 to 115 seconds so as to enable gradual or slow forming, in which the cooling time is defined based on the temperature dependency of viscosity. However, for use in tablewares that will be formed by machine after melting in a tank, a demand has been made on glass to have a temperature corresponding to the molten glass viscosity (high-temperature viscosity) Log η=2 of 1450° C. to 1470° C. and a cooling time of about 110 seconds as properties preferred for such high-speed forming.

Patent Document 1: Japanese Patent No. 3961560

When BaO and PbO are excluded from the viewpoint of environment and the content of ZnO is controlled to less than 2 percent by weight from the viewpoint of cost in a crystal glass composition, the crystal glass composition becomes a potassium-zinc crystal glass composition, but this composition can also be classified as a kind of potassium crystal glass composition.

However, no chemical strengthened potassium crystal glass composition has been known, because known potassium crystal glass compositions are not effectively chemical strengthened by a general chemical strengthening process in which, after applying an aqueous potassium solution to a surface of the crystal glass, the crystal glass is subjected to a heat treatment in a tunnel furnace for about 90 minutes so as to replace sodium ions with potassium ions.

While many high quality crystal glass tablewares have small thicknesses (rim thickness: less than 1.2 mm), it is technologically difficult to physical strengthen such thin-wall crystal glass tablewares effectively by quenching portions having small thicknesses to capture tensile stress inside and to impart a compressive stress layer only to a surface thereof.

Specifically, known high quality potassium crystal glass tablewares have underwent neither chemical strengthening nor physical strengthening, and thereby have insufficient mechanical strength and should be always handled with care.

The present inventors revealed in Japanese Patent No. 3961560 that the potassium crystal glass is not suitable for chemical strengthening because: the content of $Na_2O$, which acts as a sodium ion source in ion replacement, is as small as less than 10 percent by weight; and the content of CaO, which impedes the ion replacement, is as large as more than 5 percent by weight. In the invention disclosed therein, not the potassium crystal glass but a potassium-zinc crystal glass is controlled to be suitable for chemical strengthening. This potassium-zinc crystal glass has a composition containing 10 percent by weight or more of $Na_2O$, 4.2 percent by weight or less of CaO, and 6 percent by weight or more of ZnO.

On the other hand, it is apparent that, if such a potassium crystal glass composition containing zinc, which contributes to improvement in chemical durability, in a content of 2 percent by weight or less is rendered to contain $Na_2O$ in a content of 10 percent by weight or more, the resulting crystal glass loses its chemical durability, because the glass contains 8 percent by weight or more of $K_2O$ belonging to the same category, i.e., alkali oxides, thereby undergoes alkali excess, and this causes a network structure formed by $SiO_2$ to be opened.

All known potassium crystal glass compositions contain more than 5 percent by weight of CaO, but it has not yet been revealed how the chemical strengthening suitability varies when CaO is partially replaced not with ZnO but with another alkaline earth metal oxide (MgO, SrO).

Accordingly, demands have been made to develop a glass composition that is suitable for chemical strengthening and is inexpensive, among potassium crystal glass compositions containing less than 2 percent by weight of ZnO from the viewpoint of cost and containing less than 10 percent by weight of $Na_2O$ from the viewpoint of chemical durability.

As used herein a "glass composition suitable for chemical strengthening" refers to such a glass composition that has a sufficiently high ion-replacement rate at a temperature in a heat treatment for a relatively short time, can thereby have a deeper ion-replaced layer, i.e., a compressive stress layer, and can have a higher compressive stress due to its lower stress relaxation.

To verify that chemical strengthening is conducted effectively, the resulting surface compressive stress layer should have a stress and a thickness greater than certain levels set according to the use.

The potassium-zinc crystal glass composition disclosed in Japanese Patent No. 3961560 is imparted with a chemical strengthened compressive stress layer having a stress of more than 1000 kg/cm$^2$ and a thickness of more than 20 μm so as to increase its practical strength, as a result of heat treatment for 90 minutes according to a chemical strengthening process using an aqueous solution.

DISCLOSURE OF INVENTION

Problems to be Solved by the Invention

Accordingly, an object of the present invention is to provide a noble glass composition which is based on a known potassium-zinc crystal glass composition suitable for chemical strengthening, in which most of contained ZnO component is replaced with a combination of far inexpensive other oxides, which is easily to melt in a tank and to form by machine into table wares, which satisfies the legal conditions as crystal glass specified in the glass composition, refractive index, and density, and which is superior in chemical strengthening suitability; and to provide a chemical strengthened crystal glass article which has high practical strength as tablewares and can be subjected to washing with an alkali.

Means for Solving the Problems

Embodiment 1

The present invention provides a glass article formed from a glass containing a total of 10 percent by weight or more of potassium oxide $K_2O$ and zinc oxide ZnO, substantially containing neither lead oxide PbO nor barium oxide BaO, and having the following glass composition comprising:

$SiO_2$ in a content of more than 65 percent by weight and 70 percent by weight or less;

$Al_2O_3$ in a content of 1 percent by weight or more and 3 percent by weight or less;

$Na_2O$ in a content of 8 percent by weight or more and less than 10 percent by weight;

$K_2O$ in a content of 8 percent by weight or more and less than 10 percent by weight;

MgO in a content of 2 percent by weight or more and 3 percent by weight or less;

CaO in a content of 3 percent by weight or more and 4.2 percent by weight or less;

SrO in a content of more than 3.2 percent by weight and less than 4.2 percent by weight;

ZnO in a content of 0.5 percent by weight or more and 2 percent by weight or less;

$TiO_2$ in a content of 0.5 percent by weight or more and 2 percent by weight or less;

$Sb_2O_3$ in a content of 0 percent by weight or more and 0.4 percent by weight or less; and one or more of $SnO_2$, $Y_2O_3$, $La_2O_3$, and $ZrO_2$ in a total content of 0 percent by weight or more and 1.2 percent by weight or less.

"Substantially containing neither PbO nor BaO" mentioned herein means that the composition may contain unexpected PbO or BaO from impurities (raw materials and cullet). The impurities are at most 0.1 percent by weight of PbO and about 0.1 percent by weight of BaO respectively. It is, however, preferable that raw materials and cullet be selected carefully to prevent PbO and BaO from contaminating the composition.

The types and constitutional proportions of oxides to be contained in the glass compositions are important to achieve the objects. Accordingly, the compositional proportions of respective oxides for use in the present invention will be illustrated below, together with their contributions to properties, chemical strengthening suitability, and cost of the glass.

In this connection, the contribution of an oxide to the glass properties is partially relative and depends on the types and constitutional proportions of the other oxide components. If there occurs no interdependency between components, the composition can be easily designed. However, it is known that, when $Na_2O$ and $K_2O$, for example, are in coexistence, a remarkable interdependency known as a mixed alkali effect occurs, and the properties and chemical durability significantly vary depending on the mixing ratio of the alkalis even when the total amount of alkalis is set constant. Regarding alkaline-earth oxides (MgO, CaO, and SrO), the glass properties are expected to vary depending on the mixing ratio of the alkaline-earth oxides even when the total amount of alkaline-earth oxides is set constant. However, it has not yet been known how the chemical strengthening suitability varies as affected by the mixing ratio.

It is an object herein to maintain properties, composition, tank-melting suitability, machine forming suitability, chemical durability, and chemical strengthening suitability as necessary for crystal glass while replacing ZnO with inexpensive oxides in a known potassium-zinc crystal glass comparative composition that is suitable for chemical strengthening. This object is achieved in the present invention so that the chemical strengthening suitability is maintained by replacing the chemical strengthening suitability of ZnO mainly with that of a mixture of three alkaline earth elements; the chemical durability is maintained by replacing the chemical durability of ZnO mainly with that of $SiO_2$; and the other suitable properties are maintained by designing the total oxide composition appropriately.

Silicon dioxide $SiO_2$ is a main component for constituting a glass network structure. A glass, if having an excessively low $SiO_2$ content, may be inferior in chemical durability. In contrast, a glass, if having an excessively high $SiO_2$ content, may have a higher melting temperature and a lower density. The suitable content of $SiO_2$ is believed to be 62 percent by weight or more and 65 percent by weight or less in known chemical-strengthening-suitable potassium-zinc crystal glass compositions. The glass according to the present invention, however, can contain $SiO_2$ up to 70 percent by weight in consideration of maintaining the density of glass, since the glass can have a relatively higher melting temperature provided that it is used in tank-melting. In contrast, the $SiO_2$ content is more than 65 percent by weight herein so as to play the role of maintaining the chemical durability, because the content of ZnO that helps to exhibit chemical durability is reduced herein. In summary, a suitable $SiO_2$ content herein has been found to be more than 65 percent by weight and 70 percent by weight or less.

Aluminum oxide $Al_2O_3$ for use herein is an accessory component that is advantageous in chemical durability and in ion-replacement performance for chemical strengthening of the glass. However, a glass, if having an excessively high $Al_2O_3$ content, may have an excessively high melting temperature even provided that the glass is used in tank-melting. A suitable $Al_2O_3$ content herein has been found to be 1 percent by weight or more and 3 percent by weight or less.

Sodium oxide $Na_2O$ is a main component for lowering the melting temperature and ensuring the formability into crystal glass tablewares and ornaments.

This component also acts as a source of sodium ions that will replace potassium ions in the surface layer of the article in a chemical strengthening heat treatment process. However, if the chemical strengthening suitability is given priority and $Na_2O$ is contained in a content of 10 percent by weight or more in a potassium crystal glass composition containing a small amount of zinc as in the present invention, the resulting glass suffers from excess alkalis and thereby loses chemical durability, because it contains a large amount of $K_2O$ belonging to the same category, i.e., alkali oxides.

It has been found in the present invention that, even when the suitable $Na_2O$ content is set to less than 10 percent by weight so as to maintain the chemical durability in such a potassium crystal glass composition containing a small amount of zinc, the resulting glass can have satisfactory chemical strengthening by appropriately selecting the types of constitutional components and specifying compositional ratios thereof.

A suitable $Na_2O$ content herein is 8 percent by weight or more and less than 10 percent by weight.

Potassium oxide $K_2O$ herein is a main component essential for indicating as a qualified crystal glass. Potassium oxide $K_2O$ helps to lower the melting temperature and to impart brightness to the glass.

However, a glass, if having a $K_2O$ content of 10 percent by weight or more, may contain stones and may not sufficiently effectively chemical strengthened.

A suitable $K_2O$ content is set to 8 percent by weight or more and 10 percent by weight or less in known chemical-strengthening-suitable potassium-zinc crystal glass compositions. This suitable $K_2O$ content is also applicable to the composition according to the present invention.

Magnesium oxide MgO for use herein is an accessory component that helps to enable easy melting, to lower the devitrification temperature, to contribute to chemical durability, and to reduce the thermal expansion coefficient. However, this component may act to elongate the cooling time, because it has a low temperature coefficient of viscosity, and control in the other components should be carried out so as to maintain the formability.

Magnesium oxide MgO is not used in known chemical-strengthening-suitable potassium-zinc crystal glass compositions.

The present inventors focused attention on that, although being an expensive alkaline-earth oxide as with CaO and SrO, MgO has a small ion radius and thereby has specific influence on the structure and properties of the glass. Accordingly, the present inventors made experiments and evaluations, in which part of ZnO in the known compositions was replaced by MgO, to find that MgO in a content of more than 2 percent by weight and 3 percent by weight or less has, in the coexistence with CaO and SrO, the function of accelerating ion replacement for chemical strengthening. Consequently, MgO in the present invention is an important accessory component that has the function of accelerating ion replacement for chemical strengthening.

There are a variety of MgO materials, each of which is much more inexpensive than ZnO materials.

By way of example, use of a low-iron-content dolomite in combination with CaO results in a cost as low as about one two-hundredths of the cost of ZnO materials, and this significantly contributes to achievement of the objects.

Calcium oxide CaO effectively helps the glass to have a lower viscosity and to become liable to melt. However, excess CaO may impede the forming, because it increases the solidification rate at working temperatures. This component also acts to lower the ion replacement rate for chemical strengthening so as to render an ion-replaced layer, i.e., a strengthened layer, having a smaller thickness in a heat treatment if carried out for an identical duration. Accordingly, excess CaO component may adversely affect the chemical strengthening suitability. A CaO content is 5 percent by weight or more in known potassium crystal glass compositions and in potassium-zinc crystal glass compositions having no chemical strengthening suitability; and, in contrast, a suitable CaO content is set to be 3 percent by weight or more and 4.2 percent by weight or less in the known chemical-strengthening-suitable potassium-zinc crystal glass compositions.

The content of CaO for use in the present invention as an accessory component is set to the same as the latter.

Strontium oxide SrO effectively helps the glass to have a lower viscosity at high temperatures and to thereby become liable to melt. Among alkaline-earth oxides, SrO helps the glass to have a higher refractive index. However, excess SrO may adversely affect the thermal stability of glass, since this component functions to increase the thermal expansion coefficient. A suitable SrO content is believed to be 2 percent by weight or more and 3.2 percent by weight or less in the known chemical-strengthening-suitable potassium-zinc crystal glass compositions.

The present inventors have found that SrO in the coexistence with CaO and MgO does not impede the ion replacement for chemical strengthening. Accordingly, SrO is used herein as an accessory component that replaces part of the function of ZnO to impart chemical strengthening suitability, and the suitable content thereof is set to be more than 3.2 percent by weight and 4.2 percent by weight or less.

Zinc oxide ZnO is used herein as an accessory component that complements $K_2O$ so as to indicate as qualified crystal glass.

Among divalent metal ion oxides contained in glass, ZnO relatively helps the glass to have improved chemical durability and an increased density without increasing its thermal expansion coefficient. This component does not increase the solidification rate of glass at working temperatures and imparts chemical strengthening suitability to the glass.

A suitable ZnO content is believed to be 6 percent by weight or more and 7.2 percent by weight or less in the known chemical-strengthening-suitable potassium-zinc crystal glass compositions, but this induces a high material cost. According to the present invention, however, it has been found that the contributions of ZnO to the chemical durability and chemical strengthening suitability can be partially replaced by a combination of far inexpensive oxides.

A suitable ZnO content in the present invention is set to be 0.5 percent by weight or more and 2 percent by weight or less. However, the ZnO content is adjusted according to the $K_2O$ content so that the total content of $K_2O$ and ZnO is 10 percent by weight or more. This is for the purpose of indicating as legally qualified crystal glass.

Titanium dioxide $TiO_2$ is an accessory component that helps the glass to have a higher refractive index. However, excess $TiO_2$ may make the glass yellow and may increase the solidification rate at working temperatures to thereby impede the forming of glass. In addition, $TiO_2$ materials are expensive.

It has been found that a suitable $TiO_2$ content herein is 0.5 percent by weight or more and 2 percent by weight or less.

Antimony trioxide $Sb_2O_3$ is known to have a refining activity in melting of glass and can be used according to necessity in a content of 0 percent by weight or more and 0.4 percent by weight or less. When the crystal glass is desired to be colored, the glass may further contain any of common glass coloring agents, such as transition metal oxides, rare-earth metal oxides, and metal colloids, in a common amount.

The components $SnO_2$, $Y_2O_3$, $La_2O_3$, and $ZrO_2$ help the glass to have a higher density and a higher refractive index.

The glass has satisfactory melting ability even when it contains a total of 1.2 percent by weight or less of one or more of these oxides.

A suitable total content of $SnO_2$, $Y_2O_3$, $La_2O_3$, and $ZrO_2$ herein is 0 percent by weight or more and 1.2 percent by weight or less.

The tank melting technique employs refractory with higher resistance and is thereby carried out at a melting temperature higher than that in crucible melting. However, the temperature corresponding to the molten glass viscosity (the molten glass viscosity (high-temperature viscosity)) $Log\ \eta=2$ is preferably about 1470° C. or lower, so as to facilitate defoaming from a molten glass and to carry out melting easily.

The cooling time herein is preferably about 110 seconds to provide suitable working temperatures for machine forming of high quality crystal glass tablewares. The cooling time is defined from the temperature-dependency of viscosity which is in turn determined by the oxide composition.

According to the present invention, there has been found a glass composition which is superior in chemical durability while satisfying these melting and forming conditions.

Articles herein can be formed by any of hand forming and machine forming. The glass composition according to the embodiment of the present invention has viscosity properties suitable for machine forming of high quality crystal glass tablewares, but it has been verified that the glass composition can also undergo hand forming.

Embodiment 2

The present invention further provides a crystal glass article as the glass article according to embodiment 1, in which the glass of the article has a refractive index $n_d$ of 1.52 or more and a density of 2.5 g/cm³ or more.

The glass article according to embodiment 1 has a density of 2.5 g/cm³ or more, but it may not have a refractive index $n_d$ of 1.52 or more, because the refractive index may be slightly lower than the specified level typically when the $SiO_2$ content is set at the largest value within the specified range in embodiment 1.

In this case, the invention according to embodiment 2 can be easily obtained by configuring such a composition as to yield a refractive index $n_d$ of 1.52 or more typically by reducing the $SiO_2$ content.

The glass article according to this embodiment satisfies the conditions as legal qualified crystal glass, because it contains a total of 10 percent by weight or more of ZnO and $K_2O$ in the oxide composition and has a refractive index $n_d$ of 1.52 or more and a density of 2.5 g/cm³ or more.

These specific properties realize the luster, adequate massive feeling, and beautiful sound as crystal glass.

The high transparence can be realized by selecting a raw material that contains small amounts of impurities such as iron.

Additionally, colored crystal glass can be obtained by incorporating additives such as coloring agents into the glass according to this embodiment of the present invention.

Embodiment 3

In yet another embodiment, the present invention further provides a glass article comprising a chemical strengthened compressive stress layer having a stress of more than 1500 kg/cm² and a thickness of larger than 15 µm, wherein the glass article is prepared by forming the glass article of embodiment 1 and subjecting the formed glass article to a heat treatment so as to replace sodium ions in a surface layer of the glass with potassium ions to give the chemical strengthened compressive stress layer.

Embodiment 4

In still another embodiment, the present invention provides a crystal glass article comprising a chemical strengthened compressive stress layer having a stress of more than 1500 kg/cm² and a thickness of larger than 15 µm, wherein the crystal glass article is prepared by forming the crystal glass article of embodiment 2 and subjecting the formed glass article to a heat treatment so as to replace sodium ions in a surface layer of the glass with potassium ions to give the chemical strengthened compressive stress layer.

The heat treatment for replacing (exchanging) sodium ions in a surface layer of the glass with potassium ions gives a chemical strengthened compressive stress layer having a stress of more than 1500 kg/cm² and a thickness of larger than 15 µm. This increases the actual strength and reduces the deterioration of crystal glass tablewares products. The stress and the thickness of the stress layer herein are measured with a polarizing microscope.

In the present invention, it has been found that a chemical strengthened compressive stress layer satisfying the above-specified stress and thickness can be obtained by selecting the oxide composition of glass even when employing a common chemical strengthening process in which, after applying an aqueous potassium solution to a surface of the glass, the glass is subjected to a heat treatment in a tunnel furnace at a temperature lower than the softening temperature of the glass for about 90 minutes.

The chemical strengthening can be applied to the entire surface of the article or to part of the surface, such as the stem of a wineglass.

Advantages

The glass articles according to the present invention substantially contain neither PbO nor BaO in their glass compositions, are thereby safe, place less load on the environment, have high transparence and brightness, weight density, beautiful acoustics, and ease of forming and working equivalent to those of known crystal glass.

In addition, they have high practical strength as tablewares, because they can have a chemical strengthened compressive stress layer having a stress of more than 1500 kg/cm² and a thickness of larger than 15 µm via a process using an aqueous solution as in known chemical-strengthening-suitable potassium-zinc crystal glass articles.

In addition, the crystal glass articles according to the present invention can be obtained with cost one half of that of the known chemical-strengthening-suitable potassium-zinc crystal glass articles, because the latter contain 6% or more of expensive ZnO, but the former contain 2 percent by weight or less of ZnO. The crystal glass articles according to the present invention can provide chemical strengthened high quality crystal glass tablewares that are available in such low cost, have high practical strength, and proportionally show less deterioration. They are also superior in chemical durability and can thereby maintain high transparence and brightness even after repeated washings with a detergent.

EMBODIMENTS

Figure 1:
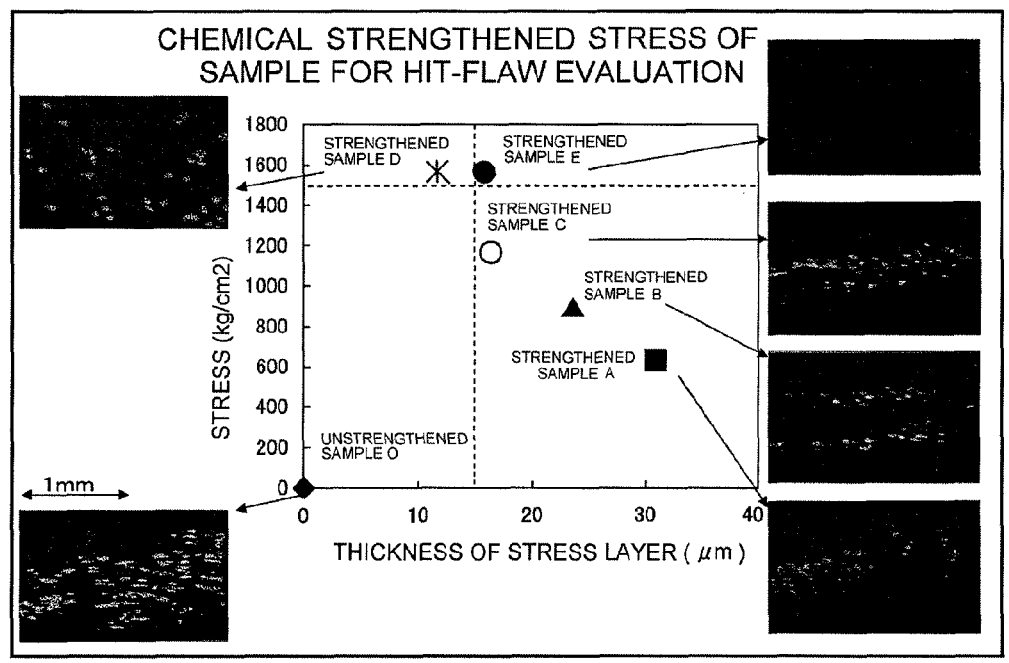
FIG. 1 is a diagram showing chemical strengthened stress in Examples according to the present invention.

Glass samples for measurements were each obtained by placing a raw material in a platinum crucible, melting the raw material in the platinum crucible in an electric furnace at 1400° C. to 1450° C. for 2 to 3 hours, pouring the molten glass into a stainless steel die, placing the molten glass in the die in an electric furnace held at an annealing temperature, and cooling the annealed glass to room temperature. Where necessary, the samples were further subjected to processing such as cutting and polishing. Tablewares such as wineglasses were prepared by melting a raw material in a closed pot, and forming the molten glass by hand.

Table 1 shows glass compositions and demonstrates that a known chemical-strengthening-suitable potassium-zinc crystal glass composition (Comparative Example 1) contains 7.2 percent by weight of ZnO, whereas glass compositions according to the present invention (Examples 1 to 3) contain ZnO in a lower content of 0.5 percent by weight or 2.0 percent by weight, as a result of replacing most of ZnO contained in the comparative composition with a combination of far inexpensive other oxides.

The composition according to Example 1 is suitable for tank melting, because of having a temperature corresponding to the molten glass viscosity (the molten glass viscosity (high-temperature viscosity)) Log η=2 of 1469° C., and has good formability in machine forming to give tablewares such as wineglasses, because of having a temperature at a viscosity of molten glass Log η=3, as an index of forming temperature, of 1220° C. and a cooling time, as an index of easy solidification, of 111 seconds.

The data also demonstrate that the composition according to Example 1 satisfies the legal conditions as qualified crystal glass specified in glass composition, refractive index, and density, as in the known chemical-strengthening-suitable potassium-zinc crystal glass composition (Comparative Example 1); and that the composition according to Example 1 is concurrently superior in chemical durability because it shows a small alkali dissolution. The crystal glass compositions according to the present invention also have chemical strengthening suitability effective for the improvement of practical strength of tablewares. This will be illustrated in detail below.

TABLE 1

| | | Example 1 | Example 2 | Example 3 | Comparative Example. 1 |
|---|---|---|---|---|---|
| Oxide composition (percent by weight) | $SiO_2$ | 67.5 | 65.0 | 67.6 | 63.2 |
| | $Na_2O$ | 9.0 | 9.9 | 9.0 | 10.8 |
| | $K_2O$ | 9.5 | 9.9 | 9.5 | 8.7 |
| | CaO | 4.2 | 3.8 | 3.8 | 3.0 |
| | MgO | 2.6 | 2.4 | 2.4 | — |
| | SrO | 3.3 | 3.3 | 3.3 | 2.0 |
| | ZnO | 0.5 | 2.0 | 0.5 | 7.2 |
| | $Al_2O_3$ | 2.0 | 2.0 | 2.0 | 2.0 |
| | $TiO_2$ | 1.0 | 1.3 | 1.0 | 2.6 |
| | $ZrO_2$ | | | 0.5 | |
| | $SO_3$ | 0.4 | 0.4 | 0.4 | — |
| | $Sb_2O_3$ | | | | 0.4 |
| Properties | Log η = 2 temperature (° C.) | 1469 | 1501 | 1472 | 1406 |
| | Log η = 3 temperature (° C.) | 1220 | 1214 | 1196 | 1149 |
| | Softening point (° C.) | 722 | 714 | 715 | 694 |
| | Cooling time (sec.) | 111 | 107 | 108 | 112 |
| | Density (g/cm³) | 2.52 | 2.56 | 2.54 | 2.62 |
| | Refractive index | 1.521 | 1.526 | 1.521 | 1.535 |
| | Expansion coefficient ($10^{-7}$/° C.) | 101 | 102 | 97 | 108 |
| | Alkali dissolution (mg) | 0.54 | — | — | 0.62 |

Table 2 demonstrates that compositions according to the present invention can maintain the function of accelerating ion replacement for chemical strengthening by replacing part of ZnO to be contained in the known composition with three alkaline earth oxides (MgO, CaO, and SrO) in specific compositional ratios.

Specifically, the glass compositions according to Example 2 and Examples 4 to 6 could each have a chemical strengthened compressive stress layer having a thickness of larger than 15 μm and a stress of more than 1500 kg even via a common chemical strengthening process in which, after applying an aqueous potassium solution to a surface of the glass, the glass is subjected to a heat treatment in a tunnel furnace at a temperature lower than the softening temperature of the glass for about 90 minutes.

In contrast, the glass compositions according to Comparative Examples 2 to 7 contain only two or less alkaline earth oxide, and whereby their chemical strengthened compressive stress layers obtained by the above process do not satisfy the conditions: a thickness of larger than 15 μm and a stress of more than 1500 kg.

The reason why the chemical strengthened compressive stress layer should have a thickness of larger than 15 μm and a stress of more than 1500 kg will be illustrated in detail below.

TABLE 2

|  |  | Example 2 | Example 4 | Example 5 | Example 6 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| Oxide composition (percent by weight) | $SiO_2$ | 65.0 | 70.0 | 68.1 | 68.1 | 69.8 | 69.6 | 68.1 | 68.1 | 68.1 | 68.1 |
|  | $Na_2O$ | 9.9 | 8.4 | 9.9 | 9.0 | 8.4 | 8.4 | 9.0 | 9.0 | 9.0 | 9.0 |
|  | $K_2O$ | 9.9 | 9.0 | 8.0 | 9.5 | 9.7 | 8.2 | 9.5 | 9.5 | 9.5 | 9.5 |
|  | CaO | 3.8 | 3.0 | 3.8 | 3.8 | 5.2 | 5.4 | 6.2 | 3.8 | 3.8 | 7.1 |
|  | MgO | 2.4 | 2.0 | 2.4 | 2.4 |  | 3.4 |  |  | 5.7 | 2.4 |
|  | SrO | 3.3 | 3.2 | 3.3 | 3.3 |  |  |  | 3.3 | 5.7 |  |
|  | ZnO | 2.0 | 0.5 | 1.1 | 0.5 | 2.5 | 2.3 | 0.5 | 0.5 | 0.5 | 0.5 |
|  | $Al_2O_3$ | 2.0 | 1.5 | 2.0 | 2.0 | 2.0 | 1.4 | 2.0 | 2.0 | 2.0 | 2.0 |
|  | $ZrO_2$ |  |  |  |  | 0.5 |  |  |  |  |  |
|  | $TiO_2$ | 1.3 | 2.0 | 1.0 | 1.0 | 1.8 |  | 1.0 | 1.0 | 1.0 | 1.0 |
| Chemical strengthened stress | Thickness (μm) | 17.4 | 21.3 | 17.8 | 15.8 | 16.4 | 12.3 | 13.9 | 12.9 | 9.8 | 18.4 |
|  | Stress ($kg/cm^2$) | 1736 | 2153 | 1944 | 1563 | 1111 | 1181 | 1563 | 1650 | 1650 | 1129 |

The practical strength of glass tablewares should be evaluated from various angles. Typically, there are high needs in the market to provide resistance to fine hit flaws. This is because the transparence of the glass surface decreases with increasing fine hit flaws, and this impairs the quality appearance of the glass.

Hit flaws are mostly caused by hitting of two or more glass tablewares with each other when they are handled. In the present invention, therefore, a hit-flaw tester was prepared which simulates motions of two formed glass articles upon hitting of glasses for toasting but gives a predetermined impact larger than that in regular hitting for toasting. Using the tester, the thickness and stress of a stress layer, which are required for sufficient resistance to hit flaws caused by hitting of glasses with each other, were determined.

A regular hitting of two glasses for toasting gives a sound pressure of 70 dB or less when measured in a space 50 cm away from the glasses using a sound pressure meter. In contrast, in the hit-flaw tester, the two glasses were hit with each other fifty times at such an impact that the sound pressure was 80 dB, and the surface of hit portion was observed visually and under a monitor microscope.

A sound pressure in a live performance of a musical instrument such as a piano or guitar is known to be about 80 dB. Accordingly, the impact energy given by the hit-flaw tester corresponds to a relatively strong mutual hitting typically in washing of glasses, and the observation of flaws given in the test enables evaluation of the practical strength.

With reference to FIG. 1, samples (Strengthened Samples A, B, C, D, and E) were prepared by forming wineglasses from the glass composition according to Example 6. The samples had different thicknesses and stresses in their chemical strengthened compressive stress layers by controlling the heat treatment conditions. These samples, together with Unstrengthened Sample O, were subjected to tests with the hit-flaw tester, and flaws, if occurred, were observed and compared.

FIG. 1 demonstrates that Strengthened Sample E suffers from no flaw, showing that the practical strength in terms of hit-flaw resistance is high when the stress layer has a thickness of larger than 15 μm and a stress of 1500 kg. Additionally, Vickers hardnesses of the samples were measured with a micro Vickers hardness meter, because the hardness also contributes to the hit-flaw resistance. The glass according to Example 6 shows a Vickers hardness of 561 Hv and 587 Hv before and after the chemical strengthening, respectively.

Figure 2:
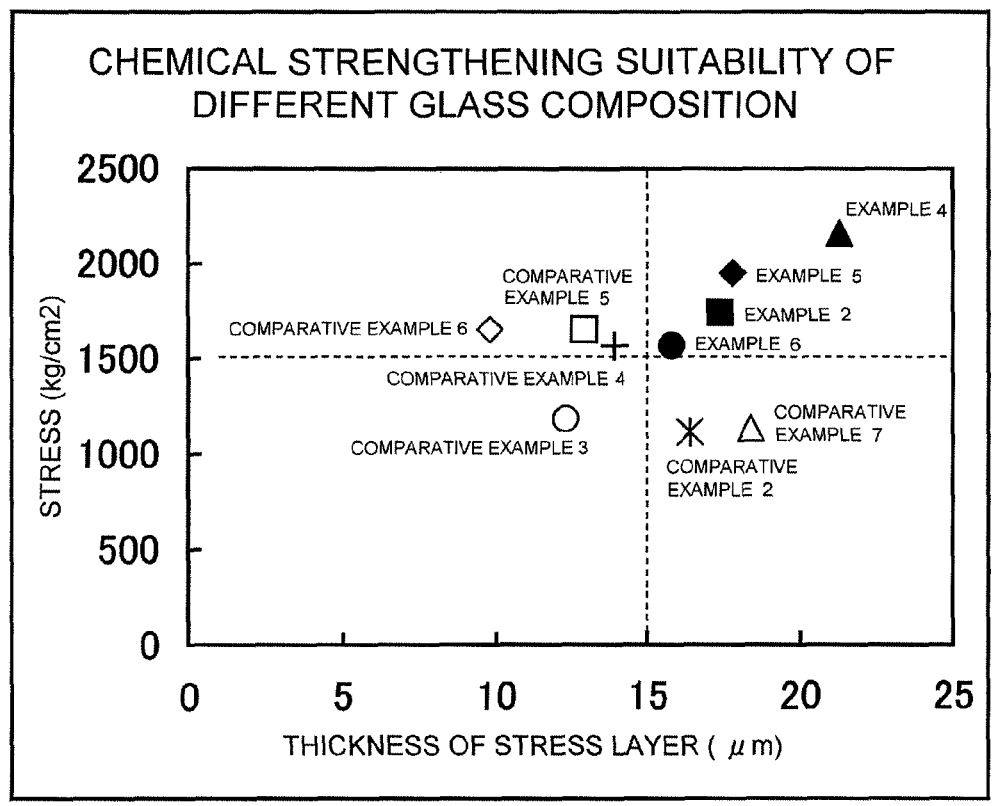
FIG. 2 is a diagram showing chemical durability of Examples according to the present invention and Comparative Examples.

The glass samples having the compositions according to Examples and those according to Comparative Examples were wetted with an aqueous potassium salt solution, and each subjected to ion replacement at temperatures suitable for ion replacement of 420° C., 440° C., 460° C., and 480° C., respectively, for 90 minutes. The thickness and stress of the resulting chemical strengthened stress layers were measured. The results in comparisons between samples showing the best performance among them are shown in Table 2 and FIG. 2. When ion replacement was carried out under some conditions within the above-specified ranges, there were obtained such samples from the compositions according to Examples as to satisfy the requirements for hit-flaw resistance, i.e., a thickness of larger than 15 mm and a stress of more than 1500 kg/cm²; in contrast, no sample that satisfies the requirements was obtained from the compositions according to Comparative Examples.

It is advantageous for glass tablewares to have a higher bending strength of the material so as to have higher practical strength.

Accordingly, the bending strength was measured in the following manner. Six samples each of 80 mm×10 mm×3 mm size were prepared from the unstrengthened glass according to Example 6, the unstrengthened glass according to Comparative Example 2, and the chemical strengthened glass according to Example 6; the breaking loads of the samples were measured using an INSTRON tester under conditions of a span between supports of 30 mm and a crosshead speed of 0.5 mm/minute in accordance with the three-point bending test method of fine ceramics (Japanese Industrial Standards (JIS) R 1601); and the bending strengths were determined from the breaking loads.

Figure 3:
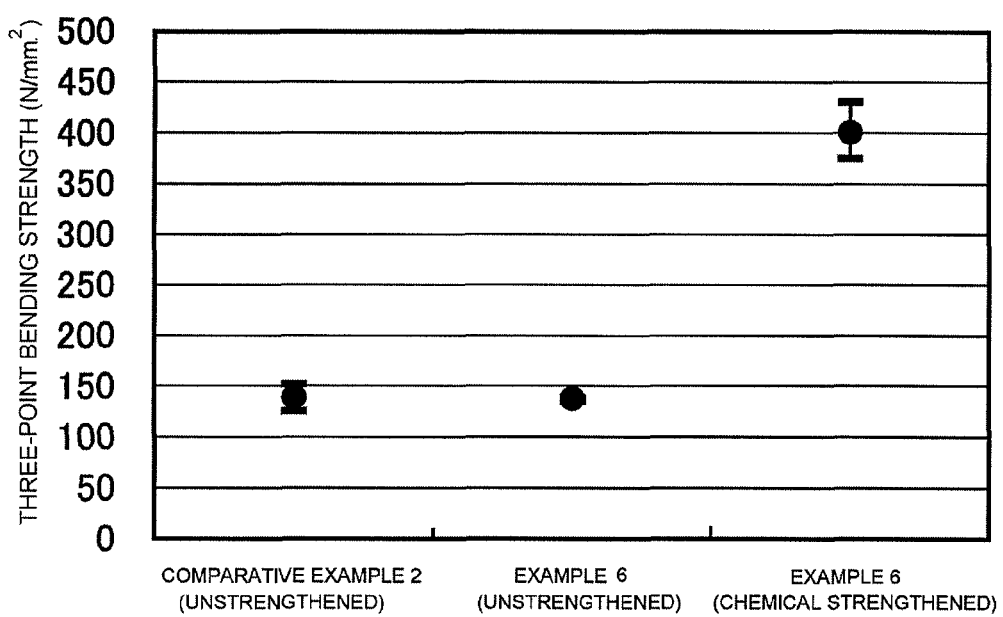
FIG. 3 is a diagram showing three-point bending strength tests on Examples according to the present invention and Comparative Examples.

With reference to FIG. 3, there was no substantial difference in strength of unstrengthened samples (138 N/mm² on the average) between the glass compositions; but when the sample obtained from the highly chemical-strengthening-suitable glass according to Example 6 was subjected to ion replacement at 420° C. for 90 minutes, the resulting strengthened sample had a strength (401 N/mm² on the average) about 3 times as much as that of the unstrengthened samples.

For evaluating brittleness, cut and ground glass specimen of 40 mm square and 5 mm in thickness was used for crack resistance measurement by micro Vickers hardness tester.

The ground glass specimen is subject to indenter of micro Vickers hardness tester with 10 different applied loads (10-2000 g) for 15 seconds, and the average number of cracks initiated is counted 30 seconds after removing load. Crack initiation load is defined as load when crack initiations at any 2 corners of residual indentation with 4 corners are observed (50% crack initiation probability). The measurement was done at 20° C. in air, using a micro Vickers hardness tester manufactured by Akashi.

Figure 4:
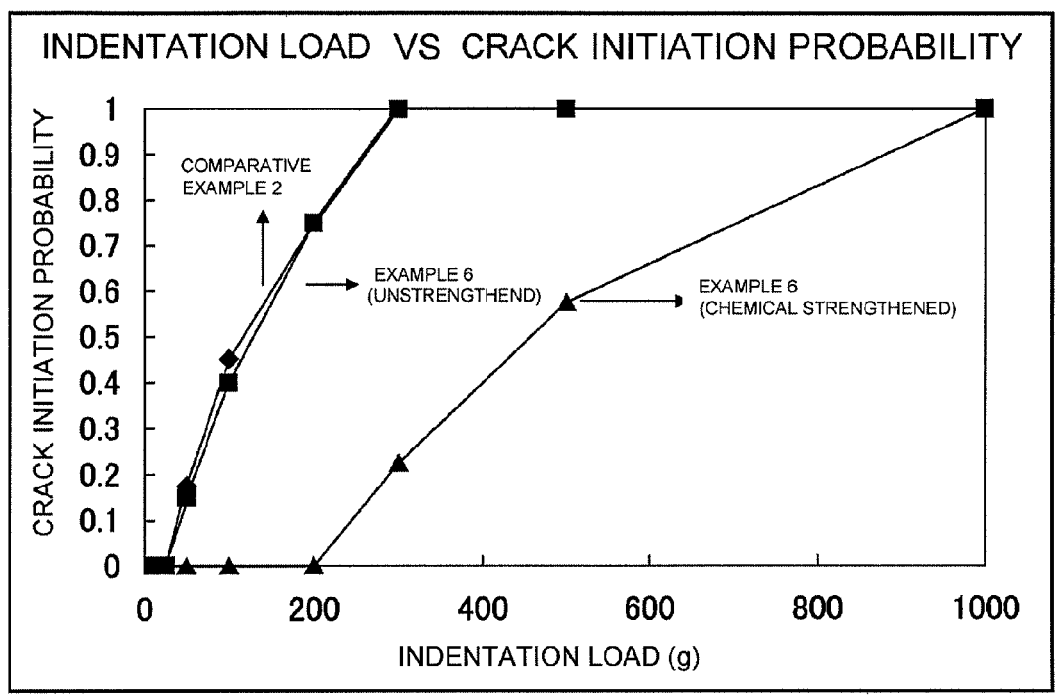
FIG. 4 is a diagram showing brittleness evaluation based on how crack initiation probability varies depending on an indentation load.

With reference to FIG. 4, the specimens of the glass sample according to Comparative Example 2 and of the unstrengthened sample according to Example 6 each show a crack initiating load of about 100 g; in contrast, the specimens of the chemical strengthened glass sample according to Example 6 shows a crack initiation load of 450 g, being 4.5 times as much as those of the other samples, indicating that effects of improving brittleness under specific conditions are expected.

The glass according to Example shows, as a result of chemical strengthening, a high bending strength, a high Vickers hardness, and a large crack initiation load and is naturally improved in mechanical strength, such as resistance against cracking and chipping, or in heat impact resistance in actual glass articles such as wineglasses. On the other hand, among chemical strength properties which glass for tablewares should have, alkali resistance is particularly required provided that the glass tablewares are used in a dish washer.

Figure 5:
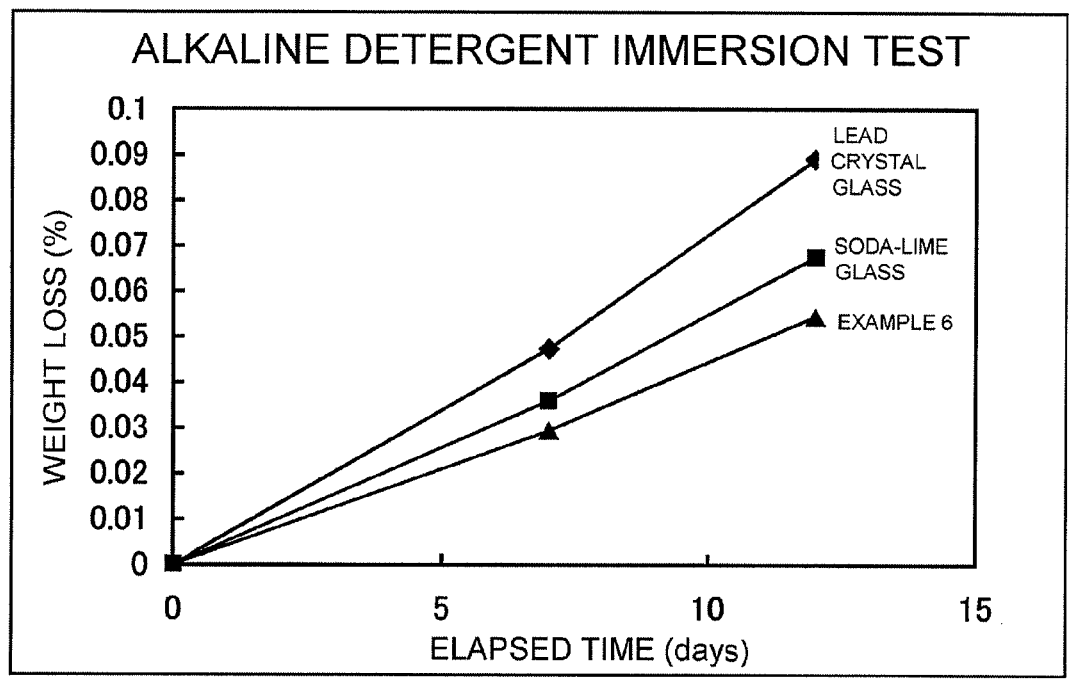
FIG. 5 is a diagram showing alkali detergent immersion tests on Examples according to the present invention.

A glass, if having insufficient alkali resistance, may become white due to erosion on the glass surface. Soda-lime glass compositions show alkali resistance under regular conditions, whereas some lead crystal glass compositions may show insufficient alkali resistance. For the evaluation of alkali resistance, glass samples of each 50 mm×35 mm×10 mm size obtained from the glass according to Example 6, soda-lime glass, and lead crystal glass were immersed in 100 ml of a 0.2% solution (pH=10.5) of an alkaline detergent (Adeka Wash-mate EP) at 65° C. for 24 hours, the samples were then retrieved, rinsed with water, and their weight losses were measured. This procedure was defined as one cycle (one day), and a total of 12 cycles (12 days) were repeated, and the results are shown in FIG. 5. The results demonstrate that the glass according to Example 6 is more resistant to glass whitening upon washing in a dish washer than the soda-lime glass, because the former shows a weight loss lower than that of the latter.

The invention claimed is:

1. A glass article formed from a glass containing
a total of 10 percent by weight or more of potassium oxide $K_2O$ and zinc oxide ZnO, substantially containing neither lead oxide PbO nor barium oxide BaO, and having the following glass composition comprising:
$SiO_2$ in a content of more than 65 percent by weight and 70 percent by weight or less;
$Al_2O_3$ in a content of 1 percent by weight or more and 3 percent by weight or less;
$Na_2O$ in a content of 8 percent by weight or more and less than 10 percent by weight;
$K_2O$ in a content of 8 percent by weight or more and 9.9 percent by weight or less;
MgO in a content of 2 percent by weight or more and 3 percent by weight or less;
CaO in a content of 3 percent by weight or more and 4.2 percent by weight or less;
SrO in a content of more than 3.2 percent by weight and less than 4.2 percent by weight;
ZnO in a content of 0.5 percent by weight or more and 2 percent by weight or less;
$TiO_2$ in a content of 0.5 percent by weight or more and 2 percent by weight or less;
$Sb_2O_3$ in a content of 0 percent by weight or more and 0.4 percent by weight or less; and
one or more of $SnO_2$, $Y_2O_3$, $La_2O_3$, and $ZrO_2$ in a total content of 0 percent by weight or more and 1.2 percent by weight or less.

2. The glass article according to claim 1, as a crystal glass article, wherein the glass of the article has a refractive index $n_d$ of 1.52 or more and a density of 2.5 g/cm$^3$ or more.

3. A glass article comprising a chemical strengthened compressive stress layer having a stress of more than 1500 kg/cm$^2$ and a thickness of larger than 15 μm, wherein the glass article is prepared by forming the glass article of claim 1 and subjecting the formed glass article to a heat treatment so as to replace sodium ions in a surface layer of the glass with potassium ions to give the chemical strengthened compressive stress layer.

4. A crystal glass article comprising a chemical strengthened compressive stress layer having a stress of more than 1500 kg/cm$^2$ and a thickness of larger than 15 μm, wherein the crystal glass article is prepared by forming the crystal glass article of claim 2 and subjecting the formed glass article to a heat treatment so as to replace sodium ions in a surface layer of the glass with potassium ions to give the chemical strengthened compressive stress layer.

* * * * *